June 24, 1941. J. P. BUCKLEY Re. 21,838

AERONAUTICAL DEVICE

Original Filed July 10, 1929 3 Sheets-Sheet 1

Inventor

John P. Buckley

By

Attorney

June 24, 1941. J. P. BUCKLEY Re. 21,838

AERONAUTICAL DEVICE

Original Filed July 10, 1929 3 Sheets-Sheet 2

Inventor

John P. Buckley

By

Attorney

June 24, 1941. J. P. BUCKLEY Re. 21,838
AERONAUTICAL DEVICE
Original Filed July 10, 1929 3 Sheets-Sheet 3
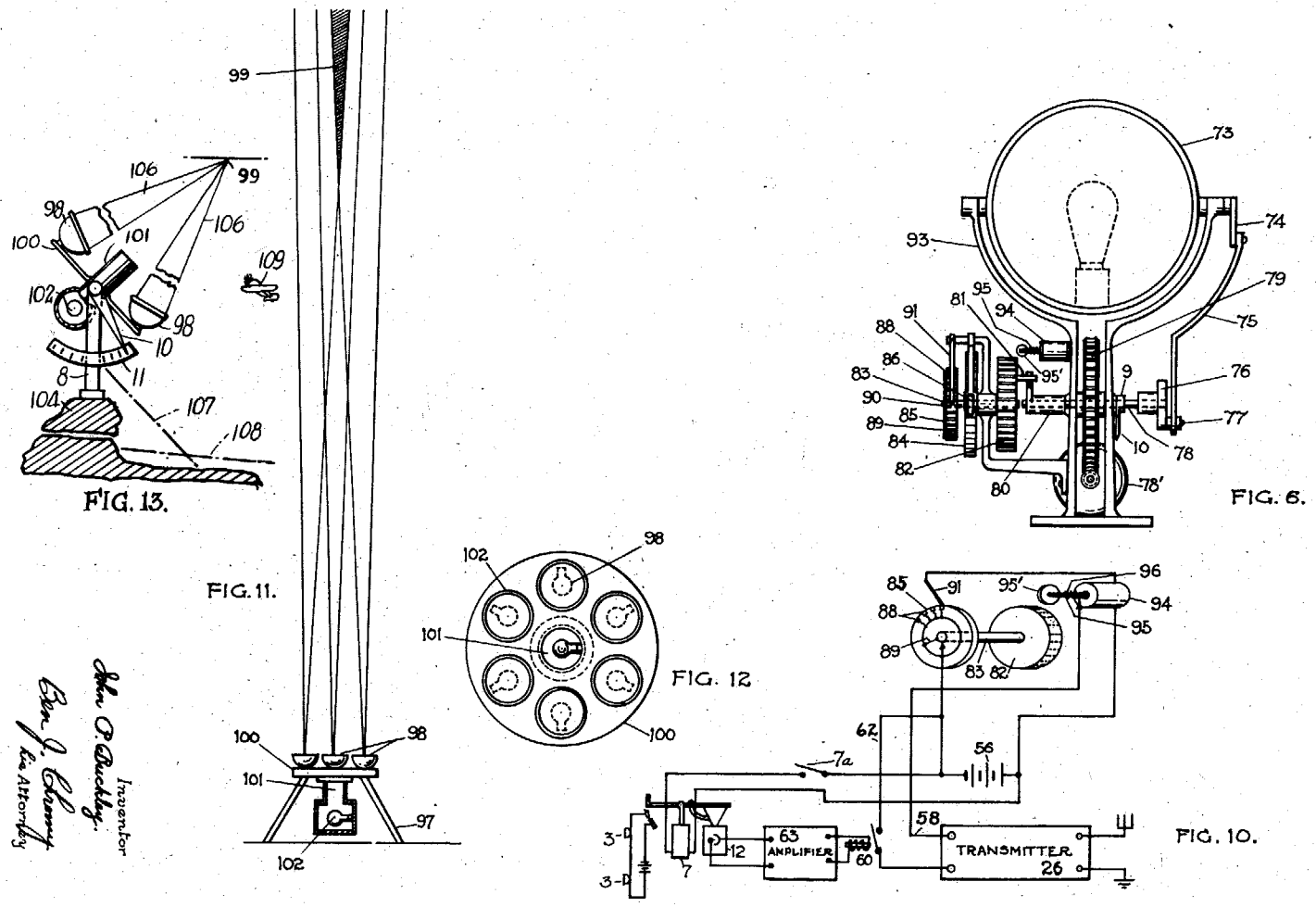
Inventor
John P. Buckley.
Ben J. Chromy
His Attorney Reissued June 24, 1941

Re. 21,838

UNITED STATES PATENT OFFICE 21,838

AERONAUTICAL DEVICE

John P. Buckley, Washington, D. C., assignor of one-half to Ben J. Chromy, Washington, D. C.

Original No. 2,081,134, dated May 25, 1937, Serial No. 377,156, July 10, 1929. Application for reissue March 29, 1939, Serial No. 264,856

25 Claims. (Cl. 177—352)

This invention relates to aeronautical devices of the fog signaling type generally. More particularly this invention relates to apparatus for automatically determining fog and cloud bank heights and transmitting signals in accordance therewith.

An object of this invention is to provide automatic means for broadcasting a signal when the ceiling height of fog or visibility becomes too low for an aeroplane to safely land.

Another object of this invention is to provide an apparatus for automatically determining the ceiling height at a predetermined location for indicating the upper surface of a fog bank existing at that location.

In accordance with this invention I provide a system which may be used advantageously on high precipices, such as, mountain tops, to determine when the upper surface of the fog bank has settled just above the mountain peak or below the peak. By using this system when flying through a dense fog towards a mountain or airport an aviator can readily determine whether or not a high ceiling prevails thereon or thereover.

With these and other objects in view the invention consists of the novel construction, arrangement and formation of parts as will be hereinafter more specifically described and illustrated in the following specification, claims and drawings. Referring to the drawings briefly, Fig. 1 is a view illustrating the use of two intersecting light beams for determining the height of clouds or a fog bank;

Fig. 5 is a schematic diagram of a light sensitive cell and associated control circuits embodied in this invention;

Figs. 6 and 7 are, respectively, a front elevation and side elevation of a modified form of the search light apparatus employed in accordance with this invention;

Figs. 8 and 9 are detail views of the circuit controlling apparatus associated with the search light of Fig. 6;

Fig. 10 shows a schematic diagram of connections between the commutator disc, code wheel and solenoid, associated with the searchlight apparatus of Fig. 6;

Fig. 11 is another modified form of the invention;

Fig. 12 is a top view of the searchlights of Fig. 11;

Fig. 13 shows the apparatus of this invention positioned on a mountain peak or precipice.

Figures 1, 2, 3, 4:
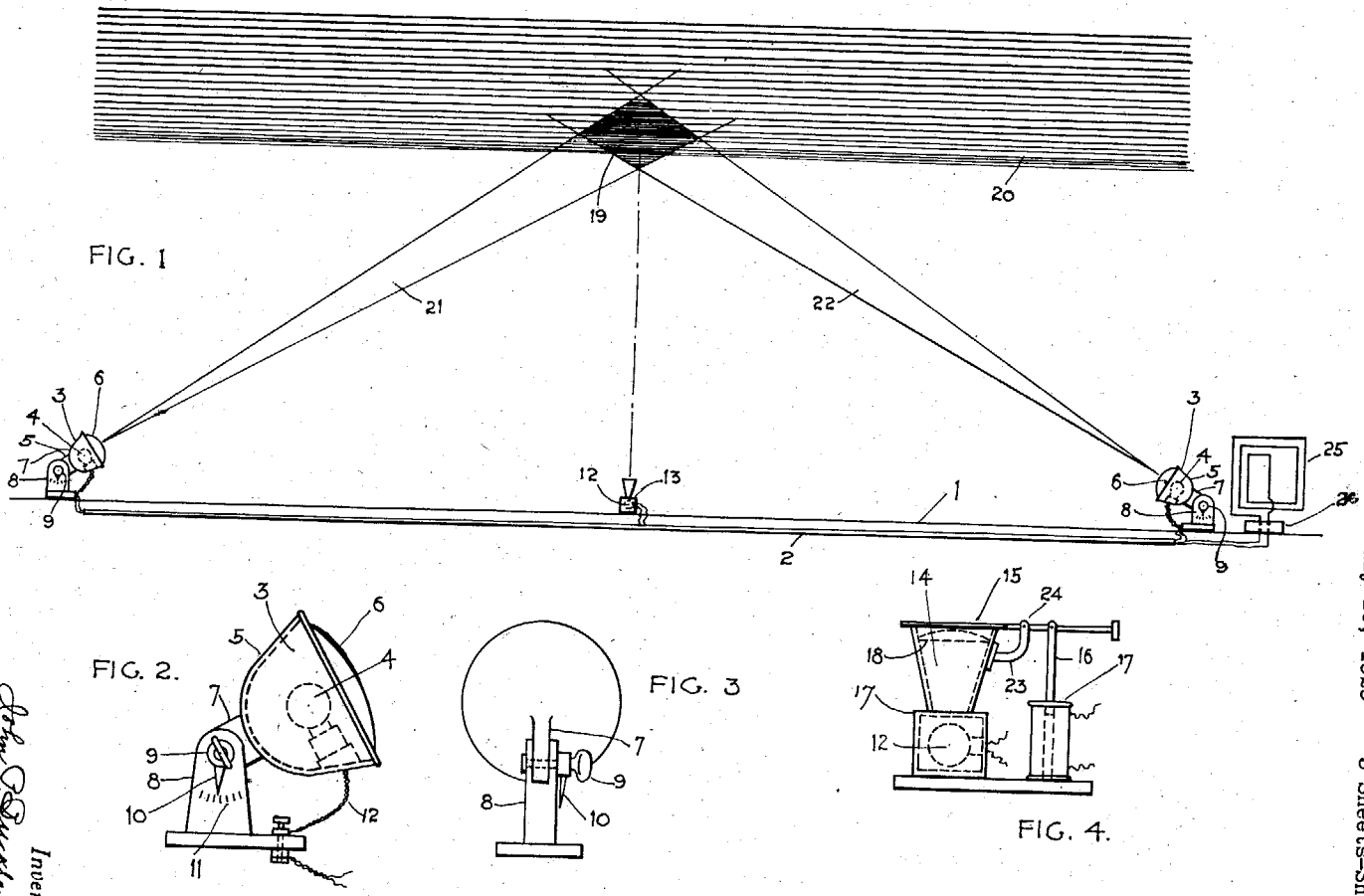
Fig. 2 is an enlarged elevation of search light employed in accordance with this invention.
Fig. 3 is a rear view of a search light employed in accordance with this invention.
Fig. 4 is of a photo-cell casing showing an automatic shutter arrangement.

The numeral 1 designates a landing field for aeroplanes, dirigibles and similar aircraft on which are positioned search light members 3, spaced apart and electrically connected by cable 2. The lamp 4, of each of the search light members, is positioned in the case 5 which supports the lens 6 and is pivotally supported by the stud 7 and the standard 8.

The clamping bolt 9 is provided with a pointer 10, which traverses the scale 11 and indicates the angle of the search light beam. The photocell 12 is housed in casing 13, the upper portion of which is provided with a tubular member 14, through which light passes to the cell when the shutter 15 is opened. A pivoted armature 16 and solenoid 17 are provided to control the shutter 15. Lens 18 is positioned in the member 14 for focusing light reflected from the spot 19, appearing on the under surface of the fog bank 20. The spot 19 is formed on the underside of the cloud or fog bank 20 by the beams 21 and 22 transmitted from the search lights 3. The light sensitive cell 12, positioned in the housing 13, is located below the spot 19 as illustrated in Fig. 1. A bracket arm 23 is supported by the member 14 for pivotally supporting the shutter at point 24.

Figures 5, 7, 8, 9:
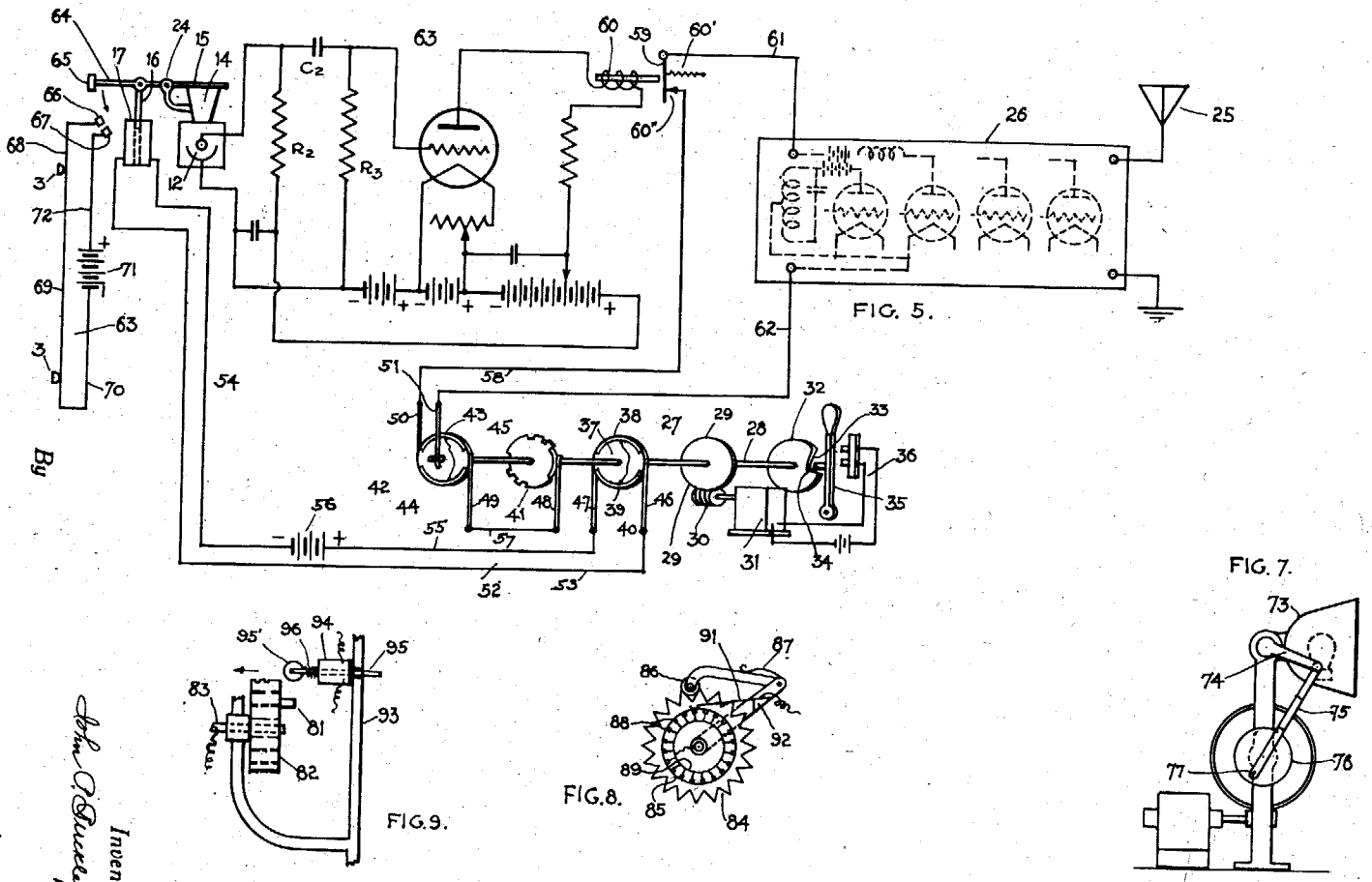

The loop antenna 25 is electrically connected with the radio transmitter 26, and while I have shown a loop antenna in this particular instance for radiating the electrical energy, any other style of antenna, as illustrated in Fig. 5, may be used effectively as well.

Referring to Fig. 5, the circuit control apparatus 27, including the shaft 28, the gear 29 and worm 30 and the circuit interrupting discs 31, 41 and 42 are provided to control the operation of the signal transmitter 26 after the circuit between the contacts 60'' and the relay armature 59 are closed. Adjacent to the gear 29 and fixed to the shaft is a cam 32, having a notch 33 for engagement with pin 34. The pin 34 of switch arm 35 engages the periphery of the cam and serves to prevent the operator from opening the motor circuit 36, until a predetermined point of the cam is reached with respect to the other circuits controlled by the shaft movement. In this way, as is illustrated by the drawings, the circuit of the motor 31 may be interrupted only when the circuits controlled by the discs 37 and 42 are also interrupted.

The insulation disc 37 carries metallic segments 38 and 39, which are electrically connected by wire 40. The metallic key disc 42 fixed on the shaft 28, has two metallic segments 43 and 44 which are joined together by link wire 45. The brushes 46, 47, 48, 49, and 50, electrically contact with the discs associated therewith and the brush 51 forms a contact with the shaft to complete the circuit through the metal code disc 41, the brushes 48, 49, and 50 and the segments 43 and 44 of the disc 42.

The brushes 46 and 47 are associated with the disc 37 to contact segments 38 and 39 and periodically interrupt the circuit 52 of the solenoid 17 which is connected to these brushes and the current supply 56 by the wires 53, 54, and 55.

The brush 48 contacts with the code letter disc 41 and serves to break the current from the transmitter 26 into signal letters. The keying disc 41 is connected through the shaft 28 and its associated brush 51 to the cathode circuit of the transmitter 26. Brushes 48 and 49 are connected together, as illustrated. Brushes 49 and 50 cooperate with the segments 43 and 44 of the disc 42 to complete the keying circuit of the transmitter 26 only while the brush 48 is on the coded portion of the disc 41. Connections 58, 61 and 62 are provided between the relay armature 59, the radio transmitter 26, the relay contact 60'' and the brushes 50 and 51. These connections cooperate with the keying disc 41 and the segments 43 and 44 of disc 42, which are connected together by the connection 45, to control the keying of the radio transmitter 26.

The circuit 63 of the search light 3 is automatically controlled by the metallic blade 65 of the shutter arm 64, which is of sufficient size to bridge over contacts 66 and 67 when drawn downward by the solenoid 17. The lamps 3 are connected in series by the connection 69. Connection 68 is provided between one of the lamps 3 and contact 66 and connection 70 is provided between the other lamp 3 and the current supply 71 which in turn is connected by wire 72 to the contact 67.

In operation the switch 35 is pulled outward and the circuit 36 of the motor 31 is closed. The motor thereupon rotates the shaft 28 together with the solenoid-circuit-interrupting disk 37, the transmitter coding disc 41 and the interrupting disc 42. The shutter 15, which controls the light to the sensitive cell 12, is thus periodically raised and lowered through the periodic energization of the solenoid 17 and the lamps 3 are also periodically energized through the operation of the switch blade 65. If a reflecting medium exists above the lamps 3 it will reflect light to the light sensitive cell 12, which is coupled to the input of the amplifier 63 by resistance units R2 and R3 and capacity C2. The amplifier 63 energizes the relay 60 and causes this relay to close the circuit between the armature 59 and the contact 60'' when the cell 12 is energized by the proper radiant energy. The keying disc 41 and circuit interrupting disc 42, being rotated by the shaft 28, cause the transmitter 26 to transmit signals characteristic of low visibility conditions over the airport or air route, in accordance with a certain predetermined code.

It is, of course, obvious that the amplifier 26 being of any conventional design, may be adjusted so that the relay 60 will either close or open the circuit between armature 59 and contact 60'' when the cell 12 is sufficiently illuminated or when light rays transmitted to this cell are interrupted.

Figs. 6, 7, 8, 9, and 10, illustrate details of a modified form of the invention wherein the lightspot is formed at different altitudes by the two light beams moved synchronously upwardly and downwardly. The lightspot formed either through the action of fog, rain or snow reflects light downward and causes the photo-cell to relay the transmitting circuit into use. This is accomplished by imparting a reciprocating motion to each of the search light members 73, which correspond to the search lights 3 of Fig. 1.

The motor 78' rotates the gear 79, shaft 78 and crank disc 76. The crank disc with the cooperation of the pin 77 and the arm 75 imparts an oscillating motion to the arm 74 and the lamp 73 which is supported by the member 93, as illustrated in Figs. 6 and 7. Fixed to the shaft also is the driving member 80 having an arm to engage the pin 81, of code signaling wheel 82, upon the periphery of which are placed the various dots and dashes, identifying the changing angles of the light beams. Secured to the code wheel 82 is shaft 83, which in turn supports the star wheel 84 in fixed relation thereto, and commutator 85 of insulating material. The star wheel 84 engages a roller 86 at the free end of a latching arm which is pressed down by a spring 87. The commutator disc 85 is provided with contacts 88, all of which are connected with the ring wire 89, which is electrically grounded to the shaft as at point 90. The brush 91 of the commutator 85 is insulated from the frame by insulation block 92. The frame 93 supports the solenoid 94, having an armature 95 and roller 95', backwardly controlled by spring 96, and forwardly controlled by the solenoid when energized.

The embodiment of this invention illustrated in Figs. 6, 7, 8, 9, and 10 operates as follows: The motor 78' which causes the lamp 73 to oscillate up and down also rotates the commutator 85, the star wheel 84 and the code wheel 82, through the operation of the pin 81 and the arm of member 80. When the brush 91, which is associated with the commutator 85, as illustrated in Figs. 6, 8, and 10, contacts with one of the segments 88 of the commutator 85 the circuit through the solenoid 94 is completed and the contactor 95' is caused to traverse the code wheel 82. This code wheel is connected through the shaft 83 and the solenoid contactor 95' to the keying circuit of the transmitter 26 (Fig. 5). In this way this circuit arrangement of Fig. 10 may be used in place of the code wheel 41 of Fig. 5 by connecting the leads 58 and 62 to the armature 95 and the shaft 83 (Fig. 10) respectively, instead of the brushes 50 and 51 of Fig. 5. This code wheel 82, armature 95 and the electrical circuit associated therewith function to key or modulate the transmitter 26 in accordance with different code characters which correspond to different angular positions of the light beam with respect to a base line or plane. It is of course obvious that the distance between the cell 12 and the light spot 19 (Fig. 1) may be readily determined when the distance between the cell 12 and the light source 4 is known and the angle of the beam 22 with respect to the plane 1 is also known.

The winding of the relay 60, which controls the circuit of the lead 62 to the transmitter 26, is connected to the output circuit of the amplifier 63. The input circuit of the amplifier 63 is connected to the photo-electric cell 12 in the same manner as shown in Fig. 5. The solenoid 7, which controls the shutter of the photo-electric cell housing, is connected to the source of current supply 56 through the switch 7a. The same source 56 is employed to energize the solenoid 94 of the contacting mechanism 96, as illustrated.

The star wheel 84 of Figs. 6 and 8 operates to make the angular movement of the code wheel 82 non-uniform. The roller 86 supported upon the periphery of the star wheel 84, is caused to bear down upon this latter wheel, by the spring 87. In this way the star wheel is rotated uniformly as this roller is caused to mount the crests formed on the periphery of this wheel; and a slight and rapid forward movement is imported to this wheel, through the action of the spring 87 and the weight of the roller apparatus, as this roller sinks into the valleys of the star wheel.

In operation the motor also partly drives the code wheel by the arm and pin movement, by one-half tooth of the star wheel, at which point the spring, bearing on the arm carrying the roller, pushes the star wheel forward clear of the arm piece 80 and settles quietly until the arm is moved forward again to contact with the pin for another one-half tooth movement. In this way alternating rest steps are imparted to the star wheel 84, likewise to the commutator disc 85, at which time electrical contact is made with the brush 91, and the solenoid is energized and pushes the roller 86, over the dot and dashes, thus automatically broadcasting the danger signal, as in the case of the fixed light beams.

Figs. 11 and 12 illustrate another modified form of the invention in which a single lightspot effect 99 is brought about by employing two or more light beams from search lights 98. The angle of intersection may be regulated to form the central lightspot at any height.

A pedestal 97 is employed for supporting two or more light reflecting members 98 on the top 100 thereof to project a plurality of light beams into a given direction or directions and form the lightspot 99 at a predetermined height. Located in the center of the table top 100, and extending downward is the channel 101, the bottom of which is enlarged and houses the photo-cell 102. The channel and photo-cell are placed directly in the center and in alignment with the lightspot, the light waves of which are free to pass on through the channel to the photo-cell.

The electrical connections employed in the embodiment of this invention shown in Figs. 11 and 12 are the same as in Fig. 5, employing the photo-cell and transmitter circuits together with the switch controls except that the contact 60'' is positioned on the opposite side of the armature 59 of relay 60.

Another embodiment of this invention is shown in Fig. 13, wherein the signaling apparatus employed for detecting the appearance of fog, is positioned on a mountain peak or precipice. Signals are broadcast from the apparatus thus located to be intercepted by aircraft pilots navigating in regions surrounding the mountains.

A pair of search lights 98 are mounted on a patform 100 which is pivoted on the upright member 8 standing on the prominence 104, such as, a mountain peak or precipice. Beams 106 are projected upwardly from the searchlights to the clouds and form the light-spot 99 from which light is reflected to the light sensitive element 102 which is positioned in the casing 101.

A pointer 10 is attached to the member 100 and to cooperate with the scale 11 for the purpose of indicating the angle and elevation of the cloud bank with respect to some predetermined altitude. The beams 106 may be tilted downward as indicated by the line 107 and may be used to indicate the presence of clouds 108.

The cloud indications determined by this arrangement are transmitted in the manner described to aircraft 109 or to distant observation points as desired.

While I have described my invention in certain of its preferred embodiments in detail it is, of course, understood that I do not desire to limit it to those exact details except in so far as they may be defined by the appended claims.

I claim:

1. Signaling apparatus comprising lamps pivotally mounted for movement in a vertical plane whereby light beams may be projected upwardly to intersect at different altitudes and form a light spot upon the lower surface of a cloud bank at different altitudes, a light sensitive cell positioned beneath said light spot for energization by light transmitted from said light spot, signaling apparatus connected to be controlled through the operation of said light sensitive cell and means for automatically broadcasting a different signal for each cloud bank altitude from said signaling apparatus when said cell is energized.

2. Signaling apparatus comprising lamps pivotally mounted for movement in a vertical plane whereby light beams may be projected upwardly to intersect at predetermined altitudes and form a light spot upon a cloud bank or similar obstruction, a light sensitive cell mounted between said lamps beneath said light spot for energization by light transmitted from said spot, means for transmitting an indication determined by the altitude of said light spot to a remote point and means having a circuit connected to said light sensitive cell for controlling the energization of said first mentioned means in accordance with the energization of said light sensitive cell.

3. Signaling apparatus comprising means for projecting light beams upwardly at an incline to form a light spot upon a cloud bank at predetermined altitudes, means for synchronously, moving said light beams in an upward and downward path, a light sensitive cell positioned to receive light from said light spot formed on said cloud bank, signal transmitting apparatus for transmitting signals by radiant energy, means controlled by said light sensitive cell for controlling the operation of said signal transmitter in accordance with the energization of said light sensitive cell, said signal transmitting apparatus including means for transmitting different code signals for different cloud altitudes.

4. Signaling apparatus comprising a searchlight pivotally mounted to project a beam of light at different angles upward to a cloud bank, a code wheel mounted adjacent to said search-light, a contacting member associated with said code wheel for contacting different code characters on said wheel as said wheel is moved through predetermined angles, means for oscillating said search-light and said code wheel through predetermined angles substantially simultaneously, a light sensitive element positioned to receive light reflected from said cloud bank, means for transmitting a radio signal in accordance with the energization of said light sensitive element and means for modulating said radio signal in accordance with the code characters contacted on said code wheel when said radio transmitter is energized.

5. Signaling apparatus including projecting means positioned to project a light beam upward to form a light spot upon a cloud bank, a light sensitive cell positioned to be energized by light reflected from the light spot formed on the cloud bank, signal transmitting apparatus and means connected to said light sensitive cell and said transmitting apparatus for controlling the operation of said signal transmitting apparatus in accordance with the energization or de-energization of said light sensitive cell.

6. Signaling apparatus comprising means for projecting light beams upwardly to interact and form a light spot upon a cloud bank at predetermined altitudes, means for determining the height of said light spot cooperating with said means, a light sensitive cell mounted to receive light transmitted from said light spot, a signal transmitter, a relay, means connected to the contacts of said relay to control said transmitter, means connected to said light sensitive cell for controlling said relay and transmitter in accordance with the energization of said cell and means connected to said first mentioned means and said signal transmitter for causing said transmitter to transmit different signals for different light spot altitudes.

7. In aeronautical signaling apparatus the combination of an oscillating light beam emitting device, means for directing the light beam in predetermined directions for forming a light spot on cloud banks existing at different positions, means for translating light energy received from said light spot into electrical energy, radio signaling apparatus, means connected to said light energy translating means for controlling the operation of said radio signaling apparatus and for effecting the transmission of different signals from said radio signaling apparatus for different cloud bank positions.

8. In aeronautical signaling apparatus the combination of a pair of oscillating light beam emitting devices, means for oscillating said devices in synchronism and for directing the light beams in predetermined directions for forming a light spot on cloud banks at different positions, means for translating light energy received from said light spot into electrical energy, radio signaling apparatus, means connected to said light energy translating means for controlling the operation of said radio signaling apparatus and for effecting the transmission of different signals from said radio signaling apparatus for different cloud bank altitudes.

9. Signaling apparatus including means for projecting light beams upwardly at an incline to form a light spot upon a cloud bank, a light sensitive cell, means cooperating with said first mentioned means for synchronously moving said light beams to form said light spot on cloud banks at different altitudes, means cooperating with said light sensitive cell, said first and said second means for selecting a signal characterized by the altitude of the cloud bank on which said light spot is formed and for transmitting said signal to a remote point.

10. Signaling apparatus comprising means for projecting a light beam upward at different angles to form a light spot upon a cloud bank or similar light obstructing media at different heights, light responsive means for translating light energy into electrical energy, signal transmitting means, connections between said light responsive means and said signal transmitting means, keying means connected to said signal transmitting means, said keying means being controlled by said first means for effecting the transmission of different characters depending on the angle of said light beam projecting means when said light responsive means is energized.

11. In signaling apparatus the combination of a radio transmitting system, a light sensitive cell, means for connecting said cell to the input circuit of said radio transmitting system, a light source pivotally mounted to project a sweeping beam of light in search of bodies of light obstructing material, said light sensitive cell being positioned to receive light from said light obstructing material only during a certain predetermined portion of said sweeping movement of said beam, means cooperating with said light source for determining the position of said light obstructing material when said cell is energized and means connected to said radio transmitting system for transmitting a predetermined signal for each determined position.

12. Signaling apparatus comprising a pair of searchlights pivotally mounted to project beams of light upward to a cloud bank, means for moving said searchlights with respect to their pivots until the beams of said searchlights intersect and form a light spot on a cloud bank, a light sensitive element for translating light energy into electrical energy positioned to receive light reflected from said light spot, a radio transmitter connected to be controlled in accordance with the energization of said light sensitive element and means connected to said transmitter for effecting the transmission of different characteristics from said radio transmitter for different cloud bank light spot altitudes.

13. Signaling apparatus comprising means for projecting a beam of light to a cloud bank, a light sensitive cell positioned to be energized by light reflected from said cloud bank, means cooperating with said first means and said cell for determining the height of said cloud bank when said cell is energized and means for transmitting a signal characterized by said height to a remote point.

14. Signaling apparatus, including: means for projecting beams of radiant energy to a remote point, said beams of radiant energy being adapted to converge upon an object of material substantially obstructing the passage thereof, means for receiving sufficient reflected radiant energy from said obstructing objects when said beams converge for the operation thereof, and signal producing means mechanically connected to said first mentioned means and connections for connecting said signal producing means to said radiant energy receiving means for energizing and actuating said signal producing means when said receiving means is energized so that said signal producing means produces signals characteristic of the distance between said radiant energy obstructing object and said receiving means each time said radiant energy receiving means is energized by reflected radiant energy from said beams converging on a reflecting object.

15. Signaling apparatus, comprising: a source of radiant energy pivotally mounted to swing through a predetermined angle with respect to a reference line and project a sweeping beam of radiant energy in search of objects at least partially obstructing the passage of such radiant energy, a member bearing predetermined legends corresponding to predetermined angular positions of said pivotally mounted source of radiant energy, said member being mechanically coupled with said pivotally mounted source of radiant energy, a cell sensitive to said radiant energy, said cell being fixedly positioned to receive radiant energy reflected from said obstructing objects, and means connected to be controlled by said cell when said cell is energized for producing electrical signals corresponding to said legends of said member, different ones of said electrical signals being produced depending upon the angular position of said source of radiant energy when said cell is energized.

16. Signaling apparatus, comprising: a source of radiant energy, pivotal mounting for said source, means for oscillating said source through predetermined angles to project a sweeping beam of radiant energy in search of objects tending to obstruct the passage of such radiant energy, a member having a plurality of angle identifying legends thereon corresponding to different angular positions of said pivotally mounted source of radiant energy with respect to a reference line, means for connecting said member to said pivotal mounting, a cell sensitive to said radiant energy, said cell being positioned to receive radiant energy reflected toward said cell along a predetermined line with respect to the aforesaid reference line, means responsive to the energization of said cell for producing electrical signals corresponding to the angle at which said pivotally mounted source of radiant energy is disposed with respect to said reference line when said cell is energized.

17. Signaling apparatus, comprising: a source of radiant energy pivotally mounted to project a beam of radiant energy in search of objects adapted to reflect at least some of the radiant energy, receiving means responsive to radiant energy reflected from any such objects, a member carrying a plurality of angle identifying legends, means for moving said member in accordance with the movement of said pivotally mounted source of radiant energy, and electrically energized means responsive to said receiving means for producing signals corresponding to the angle identifying legend characterizing the angle at which said pivotally mounted source of radiant energy is disposed when said receiving means is energized.

18. Signaling apparatus, comprising: a source of radiant energy pivotally mounted to project a beam of radiant energy in search of objects adapted to reflect at least some of the radiant energy, receiving means responsive to radiant energy reflected from any such objects, a member carrying a plurality of angle identifying legends for identifying a plurality of angles at which said pivotally mounted source of radiant energy is adapted to be disposed with respect to a reference line, means for moving said member in accordance with the movement of said pivotally mounted source of radiant energy, and means responsive to said receiving means for producing electrical impulses corresponding to the angle identifying legend identifying the angle at which said pivotally mounted source of radiant energy is disposed when said receiving means is energized.

19. Signaling apparatus, comprising: means for oscillating a beam of radiant energy through a predetermined angle with respect to a reference line across surfaces of an object normally adapted to reflect large percentages of such radiant energy, radiant energy sensitive receiving means for receiving radiant energy reflected from said object, and means responsive to said receiving means for producing different electrical impulses for each different angle at which said first mentioned means is disposed when the radiant energy reflected from said object energizes said receiving means.

20. Signaling apparatus, comprising: means for oscillating a beam of radiant energy through a predetermined angle with respect to a reference line across surfaces of an object normally adapted to reflect large percentages of such radiant energy, a single fixed radiant energy sensitive receiving means positioned to be energized by the radiant energy reflected from said object, an amplifier connected to said receiving means, and means connected to said amplifier for producing different electrical impulses for each different angle at which said first mentioned means is disposed when the radiant energy reflected from said object energizes said receiving means.

21. Signaling apparatus, comprising: means for oscillating a beam of radiant energy through a predetermined angle across surfaces of an object normally adapted to reflect large percentages of such radiant energy, radiant energy sensitive receiving means positioned to be energized by the radiant energy reflected from said object, and means responsive to said receiving means for producing different electrical impulses for different distances between said radiant energy reflecting object and said receiving means.

22. Signaling apparatus, comprising: a source of radiant energy pivotally mounted to project a beam of radiant energy in search of objects adapted to reflect at least some of the radiant energy, receiving means responsive to radiant energy reflected from any such objects, a member carrying a plurality of angle identifying legends of conducting material for identifying a plurality of angles at which said pivotally mounted source of radiant energy is adapted to be disposed with respect to a reference line, means for moving said member in accordance with the movement of said pivotally mounted source of radiant energy, electrically energized means responsive to said receiving means for contacting said legends of conducting material and for producing signals corresponding to the angle identifying legend characterizing the angle at which said pivotally mounted source of radiant energy is disposed when said receiving means is energized, electric signaling means, and connection for connecting said signaling means to said legends of conducting material and to said electrically energized means for modulating said electric signaling means in accordance with the aforesaid signals.

23. Signaling apparatus, comprising: a source of radiant energy pivotally mounted to project a beam of radiant energy in search of objects adapted to reflect at least some of the radiant energy, receiving means responsive to radiant energy reflected from any such objects, a member carrying a plurality of angle identifying legends, means for moving said member in accordance with the movement of said pivotally mounted source of radiant energy, electrically energized means responsive to said receiving means including electric switch means for producing signals corresponding to the angle identifying legend characterizing the angle at which said pivotally mounted source of radiant energy is disposed when said receiving means is energized, electric signaling means, and connections between said electric switch means and said electric signaling means for modulating said electric signaling means in accordance with the aforesaid signals.

24. Signaling apparatus, comprising: means for producing and projecting a plurality of beams of radiant energy to a remote point, at least one of said beam projecting means being pivotally mounted for oscillation through a predetermined angle so that said beams may be made to converge on surfaces of an object normally adapted to reflect large percentages of such radiant energy, radiant energy sensitive receiving means positioned to be energized by the radiant energy reflected from said object when the beams converge on said object, and means responsive to said receiving means for producing different signals for different distances between said radiant energy reflecting object and said receiving means.

25. Signaling apparatus, comprising: means for producing and projecting a plurality of beams of radiant energy to a remote point, said beam projecting means being pivotally mounted for oscillation through a predetermined angle so that said beams may be made to converge on surfaces of an object normally adapted to reflect large percentages of such radiant energy, radiant energy sensitive receiving means positioned to be energized by the radiant energy reflected from said object when the beams converge on said object, and means responsive to said receiving means for producing different signals for different distances between said radiant energy reflecting object and said receiving means.

JOHN P. BUCKLEY.